(12) United States Patent
Tan

(10) Patent No.: US 11,060,642 B2
(45) Date of Patent: Jul. 13, 2021

(54) CRANK CONNECTION STRUCTURE AND FAUCET USING THE STRUCTURE

(71) Applicant: JIANGMEN SURRAIN SHOWER CO. LTD., JiangMen (CN)

(72) Inventor: Jingwen Tan, JiangMen (CN)

(73) Assignee: JIANGMEN SURRAIN SHOWER CO. LTD., Jiangmen (CN)

( * ) Notice: Subject to any disclaimer, the term of this patent is extended or adjusted under 35 U.S.C. 154(b) by 141 days.

(21) Appl. No.: 16/233,100

(22) Filed: Dec. 27, 2018

(65) Prior Publication Data
US 2020/0056729 A1 Feb. 20, 2020

(30) Foreign Application Priority Data
Aug. 17, 2018 (CN) .......................... 201810939219.6

(51) Int. Cl.
*F16L 27/08* (2006.01)
*E03C 1/02* (2006.01)
*E03C 1/04* (2006.01)

(52) U.S. Cl.
CPC .......... *F16L 27/0808* (2013.01); *E03C 1/021* (2013.01); *E03C 1/0403* (2013.01); *F16L 27/0845* (2013.01)

(58) Field of Classification Search
CPC ............... F16L 27/0808; F16L 27/0845; F16L 27/0816; F16L 27/082; E03C 1/021; E03C 1/0403
USPC .............. 4/675, 695; 285/272, 273, 275–276
See application file for complete search history.

(56) References Cited

U.S. PATENT DOCUMENTS

| | | | | |
|---|---|---|---|---|
| 3,558,163 A * | 1/1971 | Moore et al. | ....... | F16L 27/0845 285/147.3 |
| 5,242,112 A * | 9/1993 | Dunn | .................... | B05B 15/654 285/272 |
| 5,409,066 A | 4/1995 | McHugh | | |
| 2006/0131873 A1* | 6/2006 | Klingbail | ............ | F16L 27/0845 285/147.1 |
| 2012/0292901 A1 | 11/2012 | Bong | | |
| 2015/0247600 A1* | 9/2015 | Phillips | ............... | F16L 27/0816 285/277 |

FOREIGN PATENT DOCUMENTS

AU         2008100674 A4      9/2008

\* cited by examiner

*Primary Examiner* — Tuan N Nguyen

(57) ABSTRACT

A crank connection structure includes a crank and a connection pipe. The crank and the connection pipe are connected in a plug-in manner and are rotatable relative to each other. A sealing ring is provided between the crank and the connection pipe. A faucet includes a body and the crank connection structure. The connection pipe is connected to the body. For the crank connection structure and the faucet using the structure, during the installation, only the angle relationship between the crank and the connection pipe needs to be adjusted, and the sealing ring is used for sealing the crank and the connection pipe without requiring raw material belt. The angles between the faucet body and the two cranks can be simultaneously adjusted to be at same level by rotating the faucet body, which abandons the traditional way of separately adjusting the cranks for leveling, achieving faster installation and adjustment.

2 Claims, 2 Drawing Sheets

CRANK CONNECTION STRUCTURE AND FAUCET USING THE STRUCTURE

CROSS REFERENCE TO THE RELATED APPLICATIONS

The present application claims priority to Chinese Patent Application No. 201810939219.6 filed on Aug. 17, 2018, the entire content of which is incorporated herein by reference.

TECHNICAL FIELD

The present disclosure relates to sanitary wares, and in particular to a crank connection structure and a faucet using the structure.

BACKGROUND

Traditional wall-mounted faucets usually refer to bath faucets mounted in the bathroom, which can be mounted on the wall of the bathroom, and mainly include a faucet body and a pair of cranks. The cranks are screwed and locked onto a first water supply port and a second water supply port respectively which are arranged in left-right symmetry to each other on the wall. The first water supply port and the second water supply port are typically outlets of a cold water supply pipeline and a hot water supply pipeline that are pre-buried inside the wall. The faucet body includes a cold water inlet, a hot water inlet, and at least one mixed water outlet. The cold water inlet and the hot water inlet are respectively screwed and fixed onto corresponding cranks. The threads of the cranks need to be wrapped with raw material belt for sealing.

It is well known that there is typically no uniform or precise specification for the width distance between the cold water outlet joint and the hot water outlet joint on the wall. Hence, it is necessary to design the eccentric structure of the above-mentioned crank to perform a proper rotary adjustment in the installation process so as to complete the installation smoothly.

During the installation process, the locking angle and horizontal position of the two cranks need to be accurately adjusted. However, the existing cranks are of an integrated design, and the cranks need to be continuously rotated in the adjustment process, making the raw material belt be easily loosened and worn, thus resulting in poor sealing effect and occurrence of water leakage.

SUMMARY

Aiming to address the above-mentioned technical problems, the present disclosure provides a crank connection structure so as to effectively prevent the raw material belt from being easily loosened and worn, thereby improving the sealing effect.

The disclosure is implemented by the following technical solution.

A crank connection structure is provided, which includes: a crank and a connection pipe. The crank and the connection pipe are connected in a plug-in manner and are rotatable relative to each other, and a sealing ring is provided between the crank and the connection pipe.

Further, the connection pipe includes a first mounting hole, and an end of the crank is rotatably plugged into the first mounting hole.

Further, the first mounting hole is provided therein with a first groove for receiving the sealing ring.

As another modification, the crank is provided thereon with a second groove for receiving the sealing ring.

As another modification, the crank includes a second mounting hole, and an end of the connection pipe is rotatably plugged into the second mounting hole.

As another modification, the second mounting hole is provided therein with a third groove for receiving the sealing ring.

As another modification, the connection pipe is provided thereon with a fourth groove for receiving the sealing ring.

Further, a depth at which the crank and the connection pipe are plug-connected is adjustable.

Aiming to address the above-mentioned technical problems, the present disclosure provides a faucet using the crank connection structure in another solution.

The disclosure is implemented by the following technical solution.

A faucet is provided, which includes a body and the crank connection structure described above, the connection pipe being connected to the body.

The disclosure has the following advantageous effects. As compared with the prior art during the installation process of the crank connection structure and the faucet using the structure, only the angle relationship between the crank and the connection pipe needs to be adjusted, and the sealing ring is used for sealing the crank and the connection pipe without the use of raw material belt, thus avoiding the problem that the raw material belt is easily loosened and worn, and improving the sealing effect. In this solution, the angles between the faucet body and the two cranks can be simultaneously adjusted to be at the same level by rotating the faucet body, which abandons the traditional way of separately adjusting the cranks for leveling, thereby achieving faster installation and adjustment.

BRIEF DESCRIPTION OF THE DRAWINGS

Specific embodiments of the present disclosure are further described in detail with reference to the accompanying drawings below. In the drawings.

DETAILED DESCRIPTION OF THE EMBODIMENTS

First Embodiment

Figure 1:
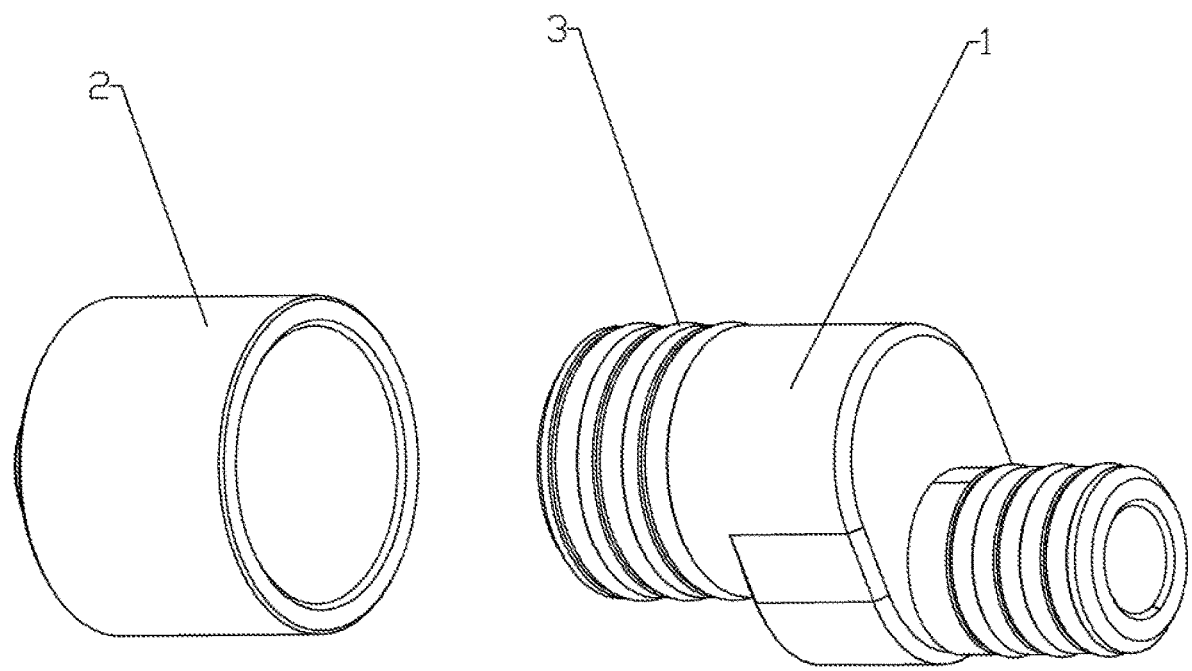
FIG. 1 is an exploded view of a crank connection structure according to an embodiment of the present disclosure.

As shown in FIG. 1, a crank connection structure is provided, which includes cranks 1 and a connection pipe 2. The connection pipe 2 may be used for connection with a water supply port inside the wall, and may also be used for connection with a water inlet of a faucet body 4. The cranks 1 and the connection pipe 2 are connected in a plug-in manner and are rotatable relative to each other, and a sealing ring 3 is provided between the crank 1 and the connection pipe 2. During the installation process, only the angle relationship between the crank 1 and the connection pipe 2 needs to be adjusted, and the sealing ring 3 is used for sealing the crank 1 and the connection pipe 2 without the use of raw material belt, thus avoiding the problem that the raw material belt is easily loosened and worn, and improving the sealing effect.

Further, the connection pipe 2 includes a first mounting hole, and an end of the crank 1 is rotatably plugged into the first mounting hole. The crank 1 includes a first pipe portion and a second pipe portion, which are communicated with each other and are eccentrically arranged. The crank 1 is adjusted in width and level with the adjacent crank by rotating in the first mounting hole.

Further, the crank 1 is provided with a second groove for receiving the sealing ring 3. The sealing ring 3 is mounted on the crank 1, and may be conveniently detached and replaced.

Further, a depth at which the crank 1 and the connection pipe 2 are plug-connected is adjustable. Typically, there is no uniform or precise specification for the extending distance of the water outlet joint on the wall. Hence, the mounting operation can be completed smoothly by properly adjusting the depth at which the crank 1 and the connection pipe 2 are plug-connected.

Figure 2:
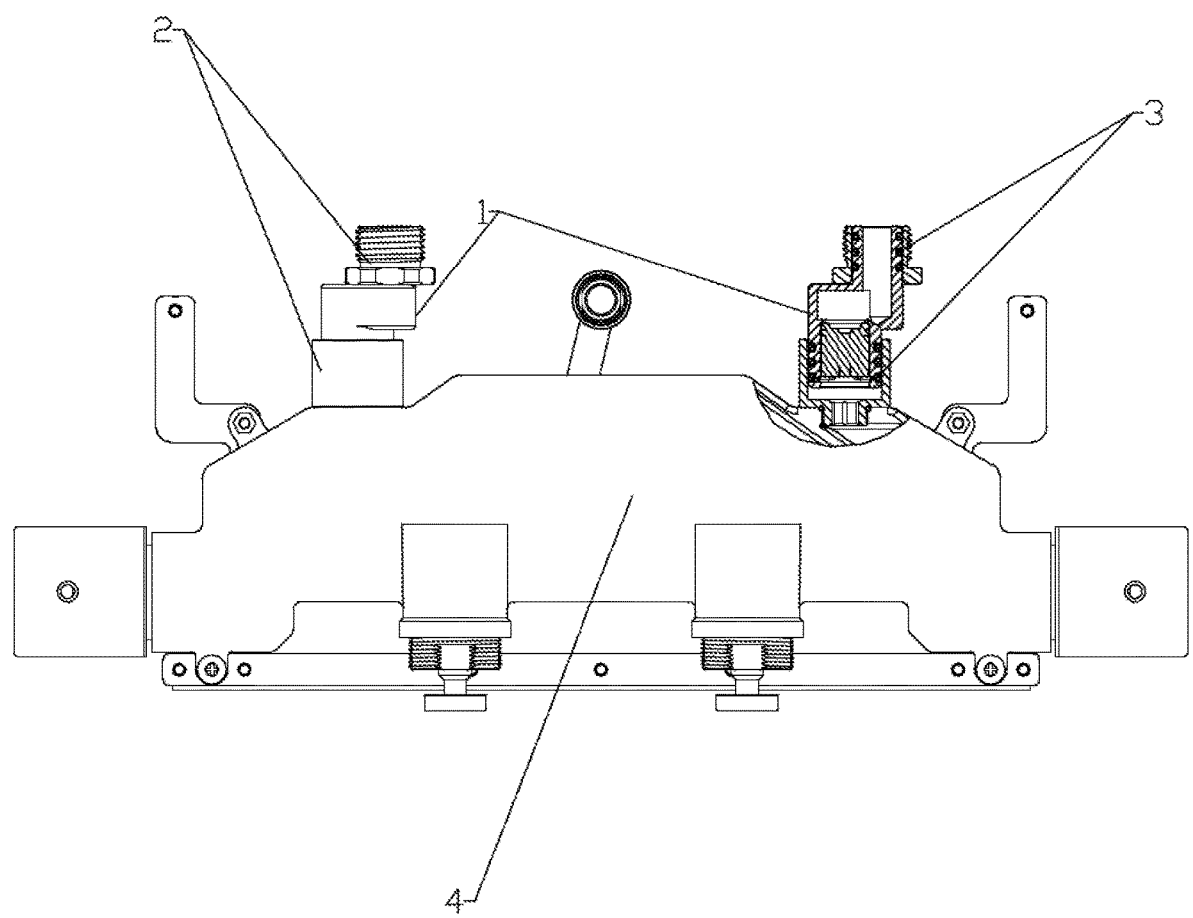
FIG. 2 is a schematic structural view of a faucet according to an embodiment of the present disclosure.

As shown in FIG. 2, a faucet is provided, which includes a body 4 and the above-described crank connection structure. One end of the connection pipe 2 connected to the body 4 is connected onto the body 4, and the other end is connected onto the crank 1. One end of the connection pipe 2 connected to the water supply port inside the wall is connected onto crank 1, and the other end is connected onto the water supply port inside the wall. The connection pipe 2 connected to the water supply port inside the wall may be a water supply pipe. The connection pipe 2 may be screwed onto the body 4, or may also be integrally formed with the body 4. In this solution, the angles between the faucet body 4 and the two cranks 1 can be simultaneously adjusted to be at the same level by rotating the faucet body 4, which abandons the traditional way of separately adjusting the cranks 1 for leveling, thereby achieving faster installation and adjustment.

Second Embodiment

This embodiment differs from the first embodiment in that, the connection pipe 2 includes a first mounting hole, and an end of the crank 1 is rotatably plugged into the first mounting hole. The first mounting hole is provided with a first groove for receiving the sealing ring 3. The sealing ring 3 is mounted on the connection pipe 2.

Third Embodiment

This embodiment differs from the first embodiment in that, the crank 1 includes a second mounting hole, and an end of the connection pipe 2 is rotatably plugged into the second mounting hole.

Further, the second mounting hole is provided with a third groove for receiving a sealing ring 3. The sealing ring 3 is mounted on the crank 1.

Fourth Embodiment

This embodiment differs from the first embodiment in that, the crank 1 includes a second mounting hole, and an end of the connection pipe 2 is rotatably plugged into the second mounting hole. The connection pipe 2 is provided with a fourth groove for receiving the sealing ring 3. The sealing ring 3 is mounted on the connection pipe 2.

The above-mentioned embodiments are only used to illustrate the technical solutions of the present disclosure, and are not intended to limit the present disclosure. Any modification or equivalent substitution made without departing from the spirit and scope of the present disclosure will fall within the scope of the technical solutions of the present disclosure.

What is claimed is:

1. A faucet, comprising two crank connection structures parallel to each other and a body separately connected to both of the two crank connection structures,
    wherein, each of the two crank connection structures comprises a crank and a connection pipe, wherein the crank and the connection pipe are connected in a plug-in manner and are rotatable relative to each other, and a sealing ring is provided between the crank and the connection pipe,
    wherein the connection pipe is cylindrical, the crank comprises a first pipe portion and a second pipe portion which are communicated with each other and are eccentrically arranged, and an axis of the first pipe portion is paralleled to that of the second pipe portion,
    wherein the crank includes a mounting hole, and an end of the connection pipe is rotatably plugged into the mounting hole,
    wherein the mounting hole is provided with a groove for receiving a sealing ring, and the sealing ring is detachably mounted on the crank and detachably received in the groove,
    wherein the connection pipe is directly connected to the body.

2. The faucet according to claim 1, wherein a depth at which the crank and the connection pipe are plug-connected is adjustable.

* * * * *